United States Patent [19]

Kang

[11] Patent Number: 5,068,290

[45] Date of Patent: Nov. 26, 1991

[54] PROCESS FOR THE CHLORINATION OF POLYOLEFINS

[76] Inventor: Hee-Dong Kang, Building 308-906, Shinbanpo 8th Apt., 112, Jamwon-dong, Sucho-ku, Seoul, Rep. of Korea

[21] Appl. No.: 516,730

[22] Filed: Apr. 30, 1990

[30] Foreign Application Priority Data

May 6, 1989 [KR] Rep. of Korea ............... 6080/89[U]

[51] Int. Cl.$^5$ .............................................. C08F 8/22
[52] U.S. Cl. .................................. 525/192; 525/333.8; 525/334.1; 525/356; 525/357; 525/359.1; 525/359.2; 525/359.3; 525/359.4; 525/359.5; 525/359.6
[58] Field of Search .................. 525/356, 334.1, 192

[56] References Cited

U.S. PATENT DOCUMENTS

| 2,928,819 | 3/1960 | Noeske | 525/334.1 |
| 3,282,910 | 11/1966 | Klug et al. | 525/334.1 |
| 3,414,556 | 12/1968 | Bungo et al. | |
| 3,429,865 | 2/1969 | Baron et al. | |
| 3,790,548 | 2/1974 | Trieschmann et al. | |
| 3,896,095 | 7/1975 | Morrisey | |
| 4,029,862 | 6/1977 | Liu et al. | |
| 4,039,732 | 8/1977 | Schoen et al. | |
| 4,144,203 | 3/1979 | Hoehne et al. | |
| 4,147,859 | 4/1979 | Davis et al. | |
| 4,197,386 | 4/1980 | Schoen | 525/356 |
| 4,425,206 | 1/1984 | Hutchinson | |
| 4,593,075 | 6/1986 | Rifi | 525/356 |

FOREIGN PATENT DOCUMENTS 1351145 4/1974 United Kingdom .

Primary Examiner—Bernard Lipman
Attorney, Agent, or Firm—Oblon, Spivak, McClelland, Maier & Neustadt

[57] ABSTRACT

A process for the chlorination of a polyolefin is provided in accordance with the present invention. This process comprises mixing an anti-coagulant with a finely divided polyolefin, and then subjecting the resulting mixture to a multi-step chlorination in the presence of a free radical generation accelerant.

The chlorinated polyolefin so produced is suitable to use as a raw material in the production of many kinds of adhesives.

16 Claims, No Drawings

PROCESS FOR THE CHLORINATION OF POLYOLEFINS

BACKGROUND OF THE INVENTION

1. Field of the Invention

The present invention relates to a process for the chlorination of polyolefins by a "chlorination-in-bulk method."

In general, the properties of and standards for chlorinated polyolefins may vary depending on the usage of desired products. However, it is required in common use that the chlorinated polyolefins have a residual crystallinity of 0 to 10% and a chlorine concentration of 35±5% to 65±5%.

2. Description of the Prior Art

Hitherto, a number of methods for the chlorination of polyolefins has been proposed. Those methods may be categorized into the three types as set forth below:

(1) An aqueous slurry method in which the chlorination is carried out by using a polyolefin suspension in water.

(2) A solvent method in which the chlorination is carried out by using a polyolefin suspension in an organic solvent.

(3) A fluidized bed method in which the chlorination is performed by fluidizing polyolefins with a mixed gas of nitrogen and chlorine.

The aqueous slurry method includes, for example, U.S. Pat. No. 3,429,865 to J. J. Baron, Jr. et. al., and Japanese Patent Publication No. (Sho)47-13,780. U.S. Pat. No. 3,429,865 discloses a process for the chlorination in which polyolefins are chlorinated in an aqueous slurry in the presence of a non-ionic surfactant. Japanese Patent Publication No. (Sho)47-13,780 teaches a process for the chlorination of polyolefins using a polyolefin slurry of a finely divided, high density polyolefin in an aqueous solution of metal chlorides. U.S. Pat. No. 4,425,206 also discloses a process for the preparation of chlorinated polyethylenes having a relatively low crystallinity which comprises chlorinating a high density polyethylenes in four steps in the presence of a free radical generation accelerant. However, the above mentioned aqueous slurry method suffers from the defects that it is essential to use the reaction chambers which should be lined with expensive anti-corrosive materials, because a low concentration of hydrochloric acid which is useless in view of the industry is formed as a by-product from the methods.

The solvent method have the drawbacks that it need a large amount of energy in the recovery of the solvent used. Nevertheless, the recovery itself of the solvent used is not easily performed; this may result in an amount of the solvent remaining in the final product. The remaining solvent not only deteriorates the quality of the product but also is harmful to the human body.

Finally, the fluidized bed method generally means the method in which the chlorination of polyolefins is carried out in a medium comprising an inert gas such as nitrogen without suspending or dissolving directly polyolefins in a liquid medium such as water or an organic solvent. This method somewhat overcomes the difficulties encountered in either the aqueous slurry method or the solvent method. However, because of using an excess amount of nitrogen gas, the concentration of the hydrogen chloride gas formed as a by-product becomes lowered. Therefore, the hydrogen chloride gas so produced has no use other than the production of hydrochloric acid. Moreover, the processing steps per se involved in this fluidized method are complicated, and the yields thereof are not so good. However, a critical defect is that it is not possible to expect an uniform chlorination for a short period of time due to the coagulation of polyolefins, which happens during the chlorination.

SUMMARY OF THE INVENTION

The primary object of the invention is to provide a process for the chlorination of polyolefins which overcomes the disadvantages resulted from the use of the aforementioned liquid or gas medium as in the prior art.

Another object of the invention is to provide a process for the preparation of chlorinated polyolefins having properties suitable to use as the raw material in the production of adhesives.

These and other objects of the invention can be achieved by the process according to the present invention which comprises mixing an anti-coagulant with a finely divided polyolefins, and subjecting the mixture to chlorination in the presence of a free radical generation accelerant.

DETAILED DESCRIPTION OF THE INVENTION

According to the invention, an anti-coagulation agent is admixed with a finely divided polyolefins and then subjecting the resultant mixture to multi-step chlorination in the presence of a free radical generation accelerant. Therefore, it should be understood that the invention is characterized in that an anti-coagulant is mixed with powdered polyolefins before chlorination.

In the invention, the term "polyolefins" means high or low density polyethylenes having a melt index of 1.0 to 5.0 or polypropylenes having a melt index of 3.5 to 12. However, it is possible to choose commercially available ones depending on the intended use thereof.

In addition, the term "finely divided" means a fine powder having a particle size of 50 to 200 mesh.

The chlorination according to the invention is hereinafter referred to as "the chlorination-in-bulk" for convenience'sake. This chlorination is distinguished from the bulk chlorination mentioned in the free fluidization method or the fluidized bed method as explained in U.S. Pat. No. 4,425,206, Column 1, Lines 21 through 26 in the following standpoint. Namely, the method disclosed in the above U.S. patent employs nitrogen gas as a medium for forming a fluidized bed, whereas nitrogen gas in the chlorination according to the invention is employed only for a short period of time in order to control the reaction rate or to dry the reaction system just prior to the initiation of reaction.

The free radical generation accelerant employed in the invention is an organic peroxide or a nitrile group-containing azo compound, which may in general be used in an amount of 0.2 to 1.0 part by weight based on 100 parts by weight of polyolefins.

The anti-coagulant employed in the invention may be selected from the group consisting of titania ($TiO_2$), talc, silica ($SiO_2$) and polystyrene sulfide, but any material having equivalent anti-coagulating properties may be used. However, it is advantageous to use an iron-free anti-coagulant, in order to ensure the improved quality of the product. It is preferred to use an anti-coagulant having a particle size ranging from 325 to 400 mesh.

The above anti-coagulants may also function as heat-transfer media.

Suitable heat transfer media may be added to the mixture which is to be chlorinated. Such media may include KCl and NaCl having a particle size of 20 to 50 mesh. According to the present invention, the anti-coagulants and the heat transfer media are used in an amount of 50 to 200 parts by weight (preferable, 100 parts by weight) and 10 to 30 parts by weight, respectively, based on 100 parts by weight of polyolefins.

According to an embodiment of the invention, finely divided polyolefin is thoroughly mixed with an anti-coagulant, a heat transfer medium, and a free radical generation accelerant in a powder mixer such as ribbon mixer. Then, dry nitrogen gas is introduced into the mixer for about an hour to dry the mixture, followed by subjecting the mixture to chlorination. The chlorination, in which a free radical reaction is involved, is carried out in a multi-step, preferably in three or four steps as set forth in Table 1 below.

TABLE 1

| Step No. | Reaction Temp. (°C.) | Concentration of $Cl_2$ gas introduced (%) | Rate of introduction of $Cl_2$ gas (g/hr. 1000 g PO*) | Concentration of chlorine in product (%) |
|---|---|---|---|---|
| 1 | 50-80 | 5-25 | 50-150 | 0-5 |
| 2 | 70-110 | 10-50 | 100-200 | 5-15 |
| 3 | 90-120 | 20-100 | 150-400 | 15-40 |
| 4 | 110-150 | 30-100 | 200-500 | 40-70 |

*PO = polyolefin

In the above chlorination, it is effective to radiate polyolefins with ultraviolet ray having a wave length of 3,000 to 4,000 Å from a mercury or ultraviolet lamp according to a known method, in order to ensure the homogeneous chlorination through both of the full length of the molecular chain and the inside of the molecule of polyolefin. The temperature of the chlorination reaction increases progressivly within the ranges of from 50° to 150° C. However, it is preferred to maintain the temperature at high temperatures unless it causes no coagulation of the finely divided polyolefin. When performing the chlorination at a low temperature below the lower limit of the above temperature ranges, a so-called "heterogeneous chlorination" will occur. In the heterogeneous chlorination, only a portion of the molecular chain or the outward surfaces of the polyolefin molecular chain are chlorinated. The heterogeneous chlorination not only gives products having a poor quality but also prolonged the reaction time, thereby the process becomes to be economically inviable. On the other hand, a high temperature exceeding the higher limit of the above temperature ranges may cause coagulation, which may not only obstruct the chlorination but also lead to an extremely undesirable result of the breakage of mixer. Especially, when the chlorination is carried out rapidly in the initial stage at a temperature above the temperature ranges, a membrane is formed on the surfaces of polyolefins, after which the chlorination is deferred to produce undesirably chlorinated polyolefins.

The chlorinated polyolefins produced according to the invention are almost in the form of amorphous and have a chlorine concentration of 30 to 70%. The chlorinated polyolefins are useful as raw materials in the production of various adhesives.

DESCRIPTION OF THE PREFERRED EMBODIMENT

The present invention will be illustrated in greater detail by way of the following non-limiting examples.

EXAMPLES

A reactor made of a nickel-steel alloy was first prepared. The reactor has an inside diameter of 300 mm, a height of 600 mm, and an inner volume of 35 L. The outer surface of the reactor was surrounded by an oil-heating jacket, and a ribbon mixer driving at 60 to 90 rpm was horizontally installed inside the reactor.

The outlet of the reactor, for evacuating the resulting gas, HCl, was connected to the inlet of the first glass bottle among three glass bottles (respective volume: 20 L) which were connected in series and contained, in turn, methanol, water and caustic soda.

Into the reactor were introduced 6 kg of polyolefin (particle size: 50 -20 mesh, MI: 1-12), 30-60 g of a free radical generation accelerant, 3-12 kg of talc and 0.6-1 kg of NaCl. Then, the contents of the reactor were purged with nitrogen gas at a rate of 80 L/min. for an hour while heating to 50°-65° C. Thereafter, chlorine gas at 50° C. was passed through the reactor at a rate of 20 L/min. to initiate the first step of chlorination. As set out in Table 1, the subsequent chlorination steps were performed by controlling amounts of the nitrogen and chlorine gases introduced and raising the temperature to 150° C. In the first and the second steps, ultraviolet ray having a wavelength of 3,000 to 4,000 Å was radiated. Hydrogen chloride (HCl) gas produced from the chlorination was first absorbed in methanol, and the remaining HCl was then absorbed in water (distilled water) and caustic soda, in turn.

The HCl absorbed methanol was mixed with 500 ml of an aqueous 10% $ZnCl_2$ solution and 20 ml of concentrated sulfuric acid, and the resulting mixture is heated to 80° to 110° C. while stirring. At this stage, methyl chloride (or ethyl chloride)-containing gas was evolved. This gas was absorbed in 15 kg of trichloroethylene in a glass bottle having an inner volume of 20 L, which was maintained at a temperature of −20° to −15° C., and the increasement in the weight of the bottle was measured. At the same time, the gas was analyzed by gas chromatography to determine the concentration of methyl chloride (or ethyl chloride). From the increasement in the weight and the concentration of methyl chloride, the amount of the by-product, i.e., methyl chloride (or ethyl chloride), was calculated. Alternatively, the amount of the same by-product could be determined by liquefying directly the evolved methyl chloride (or ethyl chloride) gas.

The residual crystallinity of the resulting chlorinated polyolefins was measured by using, for example, the differential scanning calorimeter Model 912 Mannual 9900 which is commercially available from Du Pont.

The concentration of chlorine in the chlorinated polyolefins is determined as follows: A sample is put into a glass tube, and it is heated to burn at 350° C. in the presence of oxygen in the tube. The combustion gas is absorbed in an aqueous 20% KOH solution The hypochlorite in the above solution is decomposed with $K_2CRO_4$ and a titration is conducted by using an aqueous $AgNO_3$ solution to determine the concentration of chlorine in the chlorinated polyolefins (Cf. JIS K 7229 - 1987).

Examples 1 to 12 were carried out in accordance with the above outlined procedures, and the results are listed in Table 2 below. The products having a residual crystallinity of from 0% to 10% and a chlorine concentration of from 35±5% to 65±5% were taken as the desired products.

TABLE 2

| Example No. | Polyolefin | | | | | | Anti-coagulation agent | | Heat transfer aiding agent | | Cl₂ l/min. Step | | | |
|---|---|---|---|---|---|---|---|---|---|---|---|---|---|---|
| | Type | Standard | MI | Particle Size (mesh) | Bulk density | Amount used (kg) | Type | Amount used (kg) | Type | Amount used (kg) | 1 | 2 | 3 | 4 |
| 1 | HDPE*¹ | DH E308 | 1.0 | 50-200 | 0.4 | 6 | Talc | 3 | NaCl | 1.0 | 20 | 30 | 40 | x |
| 2 | HDPE | DH E308 | 1.0 | 50-200 | 0.4 | 6 | Talc | 10 | KCl | 1.0 | 20 | 30 | 40 | x |
| 3 | HDPE | DH E308 | 1.0 | 50-200 | 0.4 | 6 | TiO₂ | 6 | KCl | 0.6 | 20 | 30 | 40 | x |
| 4 | LLDPE*² | HY DGM 1810 | 1.0 | 50-200 | 0.4 | 6 | Talc | 6 | NaCl | 1.8 | 20 | 30 | 40 | 50 |
| 5 | HDPE | DH M850 | 5.0 | 50-200 | 0.4 | 6 | Talc | 12 | NaCl | 0.6 | 20 | 30 | 40 | 50 |
| 6 | HDPE | DH M850 | 5.0 | 50-200 | 0.4 | 6 | Talc | 6 | NaCl | 0.6 | 20 | 30 | 40 | 50 |
| 7 | PP*³ | HO H430 | 3.5 | 20-200 | 0.3 | 6 | Talc | 3 | KCl | 1.8 | 20 | 30 | 40 | 50 |
| 8 | PP | HO H550 | 11 | 20-200 | 0.3 | 6 | Talc | 10 | KCl | 1.8 | 20 | 30 | 40 | 50 |
| 9 | PP | HO H550 | 11 | 20-200 | 0.3 | 6 | TiO₂ | 6 | NaCl | 0.6 | 20 | 30 | 40 | 50 |
| 10 | PP | HO H650 | 12 | 20-200 | 0.3 | 6 | TiO₂ | 6 | NaCl | 1.0 | 20 | 30 | 40 | 50 |
| 11 | PP | HO H650 | 12 | 20-200 | 0.3 | 6 | Silica | 6 | NaCl | 1.0 | 20 | 30 | 40 | |
| 12 | PP | HO H650 | 12 | 20-200 | 0.3 | 6 | Silica | 6 | NaCl | 1.0 | 20 | 30 | 40 | 50 |

| Example No. | N₂ l/min. Step | | | | Reaction temp. (°C.) Step | | | | Total reaction time (hr) | Chlorinated polyolefin | | | CH₃Cl (g) | Remarks |
|---|---|---|---|---|---|---|---|---|---|---|---|---|---|---|
| | 1 | 2 | 3 | 4 | 1 | 2 | 3 | 4 | | Wt. (kg) | Cl₂ (%) | residual crystallinity (%) | | |
| 1 | 80 | 30 | 40 | x | 50 | 80 | 100 | x | 8.0 | 9.1 | 35.6 | 17.6 | 3.1 | |
| 2 | 80 | 30 | x | x | 70 | 90 | 120 | x | 4.0 | x | x | — | — | Coagulation |
| 3 | 80 | 30 | x | x | 65 | 90 | 110 | x | 10.5 | 9.5 | 40.6 | 8.1 | 3.4 | |
| 4 | 80 | 30 | x | x | 65 | 90 | 110 | 115 | 11.5 | 10.2 | 44.5 | 3.6 | 3.5 | |
| 5 | 80 | 30 | x | x | 60 | 85 | 105 | 110 | 11.5 | 9.6 | 42.2 | 7.5 | 3.3 | |
| 6 | 80 | 30 | x | x | 60 | 90 | 110 | 120 | 22.5 | 14.9 | 62.2 | <1.0 | 7.5 | |
| 7 | 80 | 30 | x | x | 65 | 90 | 110 | 125 | 21.5 | 12.5 | 61.5 | <1.0 | 6.5 | |
| 8 | 80 | 30 | x | x | 60 | 85 | 105 | 115 | 14.5 | 10.5 | 45.5 | 1.5 | 3.6 | |
| 9 | 80 | 30 | x | x | 65 | 90 | 110 | 125 | 24.5 | 15.3 | 64.5 | <1.0 | 8.2 | |
| 10 | 80 | 30 | x | x | 65 | 90 | 110 | 115 | 14.0 | 10.7 | 46.5 | 1.2 | 3.6 | |
| 11 | 80 | 30 | x | x | 65 | 90 | 110 | x | 8.5 | 9.5 | 39.2 | 2.8 | 3.2 | |
| 12 | 80 | 30 | x | x | 65 | 90 | 110 | 125 | 24.5 | 15.5 | 65.5 | <1.0 | 8.5 | |

Notes
*¹HDPE: High Density Polyethylene
*²LLDPE: Linear Low Density Polyethylene
*³PP: Polypropylene
DH: Daihan Petrochemical Co., Ltd.
HY: Hanyang Chemical Co., Ltd.
HO: Honam Oil Refine Co., Ltd.

It can be seen from the data given in Table 2 that since the process according to the present invention does not produce hydrochloric acid as a by-product, it does not cause the problem of pollution. In view of the residual crystallinity and the chlorine concentration, the products from Examples 3, 4, 6, 7, 9, 10 and 12 comply with the object of the present invention. It can be noted from the result of Example 2 that the coagulation occurs in the reaction system when the reaction temperature of the third step exceeds 120° C.

What is claimed is:

1. A process for the chlorination of polyolefins which comprises mixing a finely divided polyolefin with an anti-coagulant selected from the group consisting of titania, talc, silica, and polystryene sulfide, and then subjecting the mixture to a multi-step chlorination in bulk in the presence of a free radical generation accelerant.

2. The process of claim 1, wherein said anticoagulant is selected from the group consisting of titania, talc, and silica.

3. The process according to claim 1, wherein a heat transfer medium is further admixed with said mixture of said polyolefin and anti-coagulant.

4. The process according to claim 3, wherein said heat transfer medium is selected from the group consisting of KCl and NaCl.

5. The process according to claim 3, wherein said polyolefin, anti-coagulant and heat transfer medium are admixed in a ratio of 100:50-200:10-30.

6. The process according to claim 5, wherein said polyolefin and anti-coagulant are admixed in a ratio of 1:1.

7. The process according to claim 1, wherein said polyolefin is selected from the group consisting of high density polyethylene, low density polyethylene, and polypropylene.

8. The process according to claim 1, wherein the initial, first and second steps of the chlorination are carried out under the action of ultraviolet ray having a wavelength of 3,000 to 4,000 Å.

9. The process according to claim 1, wherein an alkyl chloride is formed as by-products.

10. The process according to claim 9, wherein said chloride is methyl chloride.

11. The process according to claim 9, wherein said chloride is ethyl chloride.

12. The process of claim 1, wherein said anti-coagulant is titania.

13. The process of claim 1, wherein said anti-coagulant is talc.

14. The process of claim 1, wherein said anti-coagulant is silica.

15. The process of claim 1, wherein said anti-coagulant is polystyrene sulfide.

16. The process of claim 1, wherein said anti-coagulant is iron-free.

* * * * *